No. 787,303. PATENTED APR. 11, 1905.
M. C. A. LATOUR.
ALTERNATING CURRENT SERIES MOTOR.
APPLICATION FILED AUG. 30, 1904.
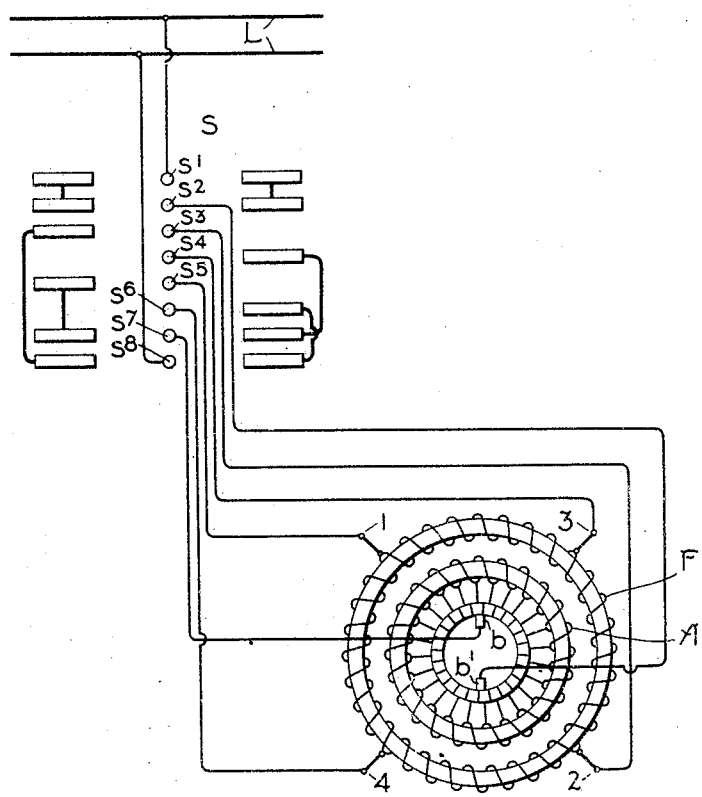
Witnesses.
Inventor.
Marius C. A. Latour.
by Albert G. Davis
Att'y No. 787,303.                                        Patented April 11, 1905.

UNITED STATES PATENT OFFICE.

MARIUS CHARLS ARTHUR LATOUR, OF PARIS, FRANCE, ASSIGNOR TO GENERAL ELECTRIC COMPANY, A CORPORATION OF NEW YORK.

ALTERNATING-CURRENT SERIES MOTOR.

SPECIFICATION forming part of Letters Patent No. 787,303, dated April 11, 1905.

Application filed August 30, 1904. Serial No. 222,684.

*To all whom it may concern:*

Be it known that I, MARIUS CHARLS ARTHUR LATOUR, a citizen of France, residing at Paris, France, have invented certain new and useful Improvements in Alternating-Current Series Motors, of which the following is a specification.

My invention relates to series-wound alternating-current motors of the commutator type. It has been proposed heretofore to improve the power factor and efficiency of motors of this type by providing them with a third winding in addition to the usual field and armature winding. This third winding is placed in inductive relation to the armature, which means in non-inductive relation to the field, since the magnetization of field and armature are displaced by ninety degrees and may be short-circuited or connected in series with the armature-winding. In either case it carries current in the opposite direction to that in the adjacent armature-conductors, and consequently serves to neutralize the self-induction of the armature as well as the armature reaction, and thereby to improve the power factor and efficiency of the motor. For this reason it is commonly termed a "compensated" winding. I have discovered that a single winding may serve the purpose of both field and compensating winding in a series motor if the brushes are displaced from the ninety-degree relation by the proper amount. Thus if the brushes are shifted from the usual position so that the magnetization produced by the armature makes a smaller angle than ninety degrees with the magnetization produced by the field the field magnetization may be considered as split up into two components, one of which at right angles to the armature magnetization corresponds to the ordinary field magnetization, while the other, parallel to the armature magnetization, performs the function of the magnetization produced by the usual compensating winding. With a motor thus arranged a difficulty is encountered when it is attempted to reverse the motor. In an ordinary series motor without compensating windings the reversal is of course attained by simply reversing the relative connections of field and armature. When a compensating winding is used, the same method can be employed, provided the precaution is taken of maintaining the relative connections of armature and compensating windings always the same. The necessity for this is obvious. When, however, the field and compensating windings are combined into a single winding, it is obvious that the connections of this winding cannot be reversed with reference to the armature in order to reverse the direction of the motor, since this would reverse the direction of the compensating turns relative to the armature-conductors.

My invention consists in providing such a motor as has been above described, in which the field and compensating windings are combined in one, with an additional set of terminals, so that when it is desired to reverse the motor the connections from the source of current may be shifted from one set to another, the two sets being so arranged that while the direction of current is reversed in that portion of the winding which produced the magnetization at right angles to the armature magnetization the current is not reversed in that portion of the winding which produces magnetization parallel to that of the armature.

My invention will best be understood by reference to the accompanying drawing, in which is shown diagrammatically a motor and reversing-switch therefor arranged in accordance with my invention.

In the drawing, F represents a distributed field-winding having two sets of terminals 1 2 and 3 4.

A represents the armature-winding provided with the usual commutator and the commutator-brushes $b$ $b'$.

L represents the line-wires or other suitable source of alternating current to which the motor is connected through the reversing-switch S. Reversing-switch S has eight stationary contact-fingers $s'$ to $s^8$ and two sets of movable contacts, as shown. If the reversing-switch S is moved to bring the left-hand set of movable contacts into engagement with the stationary contacts, the following circuit is completed: from one line-wire to contact-finger $s'$, finger $s^2$, brush $b'$ through the armature-winding, brush $b$, contact $s^7$, contact $s^5$, field-terminal 1, through the field-winding, field-terminal 2, contact $s^3$, contact $s^8$, to the second line-wire. The current consequently may be considered at any instant as entering at the lower commutator-brush, passing out at the upper brush, entering the upper left-hand field-terminal 1, and passing out at the lower right-hand field-terminal 2. Now if the field-winding F be considered as split up into two parts it will be readily seen that this single winding performs the functions of the usual field and compensating windings. Thus the portions of the winding between terminals 1 and 4 and between terminals 3 and 2 evidently produce a magnetization parallel to the magnetization produced by the armature, and consequently perform the function of the usual compensating winding. On the other hand, the portions of the field-winding between terminals 1 and 3 and between terminals 4 and 2 produce a magnetization at right angles to that produced by the armature, and consequently perform the function of the ordinary field-winding. To reverse the motor, it is evident that the direction of current between terminals 1 and 3 and between terminals 4 and 2 should be reversed, while the direction of current between terminals 1 and 4 and between terminals 3 and 2 should be maintained constant. Evidently if the connection from commutator-brush $b$ be shifted from terminal 1 to terminal 3 while the connection from the line-wire is shifted from terminal 2 to terminal 4 the above result will be accomplished. This is the change in the motor-circuits produced by shifting the reversing-switch S from one position to the other. Thus in the form of motor which I have shown a single winding takes the place of two windings in the ordinary compensated series motor, while by means of my invention the motor may be reversed in direction as readily as a motor of the ordinary type.

Although I have shown my invention as applied to a bipolar motor with Gramme ring-windings on both members, it will be understood that my invention is applicable to a motor having any number of poles and any well-known form of distributed field-winding. A distributed drum-winding placed in slots on the field structure is the form of winding that would preferably be employed. Accordingly I do not desire to limit myself to the particular construction and arrangement of parts here shown; but I aim in the appended claims to cover all modifications which are within the scope of my invention.

What I claim as new, and desire to secure by Letters Patent of the United States, is—

1. In an alternating-current motor, an armature-winding provided with a commutator, and a distributed field-winding connected in series therewith and provided with two sets of terminals so disposed that the current through a portion only of said field-winding is reversed upon alternately connecting said two sets of terminals in circuit.

2. In an alternating-current motor, an armature-winding provided with a commutator, a distributed field-winding provided with two sets of terminals, each set being displaced at an angle to the line of magnetization produced by the armature-winding, and means for connecting either set of terminals in circuit with the armature.

3. In an alternating-current motor, an armature-winding provided with a commutator, a distributed field-winding connected in series with the armature-winding, said field and armature windings being arranged to produce magnetizations at an angle of less than ninety electrical degrees, and means for reversing the direction of current through a portion only of said field-winding.

4. In an alternating-current motor, an armature-winding provided with a commutator, a distributed field-winding connected in series with the armature-winding, said field and armature windings being arranged to produce magnetizations at an angle of less than ninety electrical degrees, and means for reversing the direction of current in that portion of the field-winding which produces a magnetization at right angles to that of the armature without reversing the direction of current in that portion that produces a magnetization parallel to that of the armature.

In witness whereof I have hereunto set my hand this 18th day of August, 1904.

MARIUS CHARLS ARTHUR LATOUR.

Witnesses:
HANSON C. COXE,
JOHN BAKER.